United States Patent
Alhaug

(10) Patent No.: US 8,770,628 B2
(45) Date of Patent: Jul. 8, 2014

(54) SEAL ASSEMBLY FOR NESTED DUAL DRILL PIPE

(75) Inventor: Espen Alhaug, Stavanger (NO)

(73) Assignee: Reelwell, A.S., Royneberg (NO)

( * ) Notice: Subject to any disclaimer, the term of this patent is extended or adjusted under 35 U.S.C. 154(b) by 55 days.

(21) Appl. No.: 13/472,579

(22) Filed: May 16, 2012

(65) Prior Publication Data

US 2013/0181439 A1 Jul. 18, 2013

Related U.S. Application Data

(63) Continuation-in-part of application No. 13/348,818, filed on Jan. 12, 2012.

(51) Int. Cl.
F16L 19/00 (2006.01)

(52) U.S. Cl.
USPC .............. 285/123.12; 285/123.13; 285/123.3; 285/379

(58) Field of Classification Search
USPC ........... 285/338, 347, 379, 374, 123.3, 123.4, 285/123.5, 123.6, 123.7, 123.9, 123.11, 285/123.12, 123.13, 123.14, 123.8
See application file for complete search history.

(56) References Cited

U.S. PATENT DOCUMENTS

| | | | | |
|---|---|---|---|---|
| 2,850,264 | A | | 9/1958 | Grable |
| 3,065,807 | A | * | 11/1962 | Wells ........................ 285/123.3 |
| 3,208,539 | A | * | 9/1965 | Henderson ................. 285/123.3 |
| 3,438,657 | A | * | 4/1969 | Torres ........................... 285/379 |
| 3,471,177 | A | * | 10/1969 | Garrett et al. .............. 285/123.3 |
| 3,552,779 | A | * | 1/1971 | Henderson ................. 285/123.3 |
| 3,664,441 | A | * | 5/1972 | Carey ......................... 285/123.3 |
| 3,786,878 | A | * | 1/1974 | Chapman ................... 285/123.3 |
| 3,998,479 | A | * | 12/1976 | Bishop ....................... 285/123.3 |
| 4,012,061 | A | * | 3/1977 | Olson ......................... 285/123.3 |
| 4,067,596 | A | * | 1/1978 | Kellner et al. ............. 285/123.3 |
| 4,082,323 | A | * | 4/1978 | Wood et al. ................ 285/123.3 |
| 4,632,406 | A | | 12/1986 | Akkerman |
| 4,655,479 | A | | 4/1987 | Farr, Jr. |
| 4,928,999 | A | | 5/1990 | Landriault |
| 5,029,906 | A | | 7/1991 | Chelette |
| 5,423,575 | A | * | 6/1995 | Parks ......................... 285/123.1 |
| 7,152,700 | B2 | * | 12/2006 | Church et al. ............. 285/123.3 |
| 2005/0183892 | A1 | | 8/2005 | Oldham | |

FOREIGN PATENT DOCUMENTS

DE 1020586 12/1957

OTHER PUBLICATIONS

Notification of transmittal of the international search report and written opinin of the ISA, PCT/EP2013/050508, Dec. 2, 2013.

* cited by examiner

*Primary Examiner* — David E Bochna
(74) *Attorney, Agent, or Firm* — Richard A. Fagin

(57) ABSTRACT

A seal assembly for a nested dual drill pipe includes a tube having a female seal assembly and a male seal assembly at the longitudinal ends. The female seal assembly includes a larger internal diameter portion, a taper adjacent thereto and a smaller internal diameter portion adjacent to the taper. The male seal assembly includes a smaller external diameter portion, a seal groove adjacent thereto and a larger external diameter portion adjacent to the seal groove. The smaller internal diameter portion and the larger external diameter portion have diameters selected to enable free longitudinal movement of the male seal assembly into the female seal assembly while limiting axial displacement to maintain the seal ring fully energized.

16 Claims, 8 Drawing Sheets

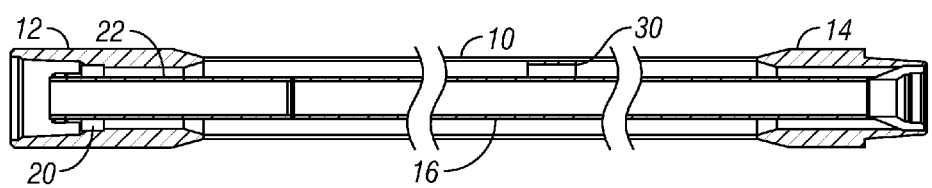
FIG. 1
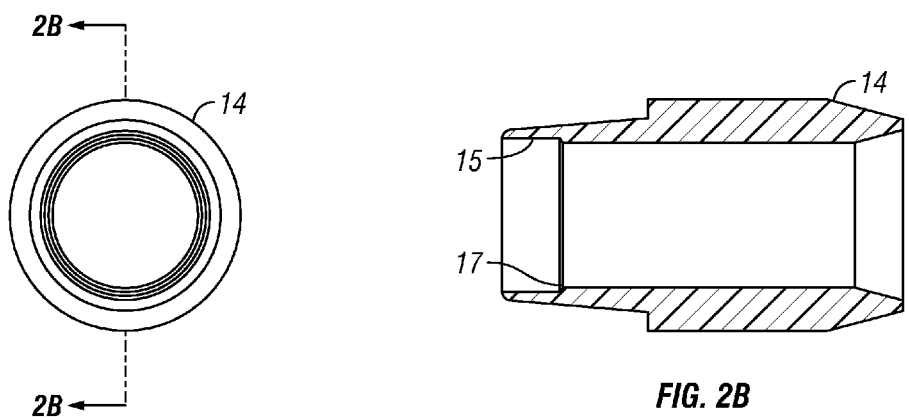
FIG. 2A
FIG. 2B

SEAL ASSEMBLY FOR NESTED DUAL DRILL PIPE

CROSS-REFERENCE TO RELATED APPLICATIONS

Continuation in part of U.S. patent application Ser. No. 13/348,818 filed on 12 Jan. 2012 and incorporated herein by reference.

STATEMENT REGARDING FEDERALLY SPONSORED RESEARCH OR DEVELOPMENT

Not applicable.

BACKGROUND

The disclosure relates generally to the field of drill pipe used in drilling wellbores through subsurface formations. More particularly, the disclosure relates to "dual" drill pipe, in which two separate fluid conduits are provided within a single pipe extending from a drilling unit into a wellbore, and to seals for maintaining fluid tight connections between inner fluid conduits within such dual drill pipe.

Dual drill pipe is disclosed, for example, in U.S. Pat. No. 3,208,539 issued to Henderson. Generally, dual drill pipe includes conventional, threadedly connected drill pipe, such as conforms to standards set by the American Petroleum Institute, Washington, D.C. An inner conduit or tube may be disposed in the interior of the conventional drill pipe to provide an additional fluid conduit. As explained in the Henderson '539 patent, the additional fluid conduit may be used to transport drill cuttings from a drill bit back to the surface during drilling operations. A possible advantage of using the additional conduit for such purpose is that the conduit has smaller cross-sectional area than an annular space between the exterior of the conventional drill pipe and the wall of the wellbore. Such smaller cross-sectional area enables higher drilling fluid velocity, thus requiring less drilling fluid flow to entrain the drill cuttings and return them to the surface. Another possible advantage of using the additional conduit for cuttings return is in drilling highly inclined wellbores. In such wellbores, cuttings tend to settle on the bottom of the wellbore, sometimes leading to "packing", and having the drill pipe become stuck in the wellbore as a result.

Dual drill pipe structures known in the art may require extended seal engagement features for the inner tube to be sealingly engaged between segments of the dual drill pipe, and such seal engagement features may not accommodate extensive axial misalignment of the segments of drill pipe during assembly or disassembly. There exists a need for improved sealing devices for the inner pipe of a nested dual drill pipe.

SUMMARY

A seal assembly according to one aspect for a nested dual drill pipe includes a tube having a female seal assembly and a male seal assembly at the longitudinal ends, the tube nestable in a segment of drill pipe having tapered threads at each longitudinal end. The female seal assembly includes a larger internal diameter portion, a taper adjacent to the larger internal diameter portion and a smaller internal diameter portion adjacent to the taper. The male seal assembly includes a smaller external diameter portion, a seal groove adjacent to the smaller external diameter portion and a larger external diameter portion adjacent to the seal groove. The larger internal diameter portion and the smaller external diameter portion have diameters selected to prevent damage to a seal ring disposed in the seal groove at maximum axial displacement during assembly of two pipe segments. The smaller internal diameter portion and the larger external diameter portion have diameters selected to enable free longitudinal movement of the male seal assembly into the female seal assembly while limiting axial displacement to maintain the seal ring fully energized.

Other aspects and advantages will be apparent from the description and claims which follow.

BRIEF DESCRIPTION OF THE DRAWINGS

FIG. 1 shows an example of an assembled dual drill pipe segment according to the invention.

FIGS. 2A and 2B show, respectively, an end section and a side section of an example male (pin) end of conventional drill pipe modified to retain an inner tube.

DETAILED DESCRIPTION

Figure 3A:
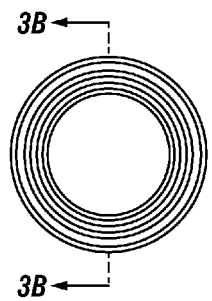
FIGS. 3A and 3B show, respectively, an end section and a side section of an example female (box) end of conventional drill pipe modified to retain an inner tube.

An example of a dual drill pipe according to the various aspects of the invention is shown in cut away view in FIG. 1. The dual drill pipe 11 may include a segment ("joint") 10 of "conventional" drill pipe, for example as made to industry standards set by the American Petroleum Institute, Washington, D.C. ("API") Conventional drill pipe may be threadedly connected end to end using API standard threaded couplings called "tool joints" disposed at each longitudinal end of the drill pipe joint 10. The couplings are typically referred to as a "box" or female threaded end, shown at 12 in FIG. 1, which threadedly engages and makes a sealed connection to a "pin" or male threaded end in an adjacent pipe joint. The pin end is shown at 14 in FIG. 1. The threads on the box end and the pin end may be tapered, and the significance of such thread taper will be further explained below. It is also within the scope of the present disclosure that adjacent segments of drill pipe have pin end and box end tool joints that couple together other than using external threads on the pin end and internal threads on the box end. In such examples, a seal assembly as explained herein may be used with any combination of tool joints on the outer (drill) pipe that are guided together using corresponding tapered features on the respective tool joints. For purposes of defining the scope of the present disclosure, the foregoing features, including tapered threads, may be referred to as "tapered guides." For purposes of explaining the various examples herein, the term "axial displacement" may be used to describe the amount of offset between the longitudinal axis of each of the two segments of drill pipe being assembled.

An inner conduit or tube 16 may be disposed in the interior bore of the pipe joint 10. A tube retainer 18 may be affixed to one end of the inner tube 16. The tube retainer 18 may have an internal bore (explained further below) configured to sealingly engage the opposite end of the inner tube 16 wherein suitable sealing devices may be used to provide a pressure tight seal between adjacent segments of the inner tube 16, wherein such adjacent segment is included in an adjacent joint of the dual drill pipe 11. The opposite end of the inner tube 16 may include a device 20 to retain the inner tube 16 longitudinally fixed in the interior of the pipe joint 10. The device 20 may include passages 24 to enable fluid to be moved in an annular space 13 between the outer wall of the inner tube 16 and the inner wall of the pipe joint 10. A plurality of standoffs 30 may be affixed to the exterior wall of the inner tube 16 at longitudinally spaced apart positions and at various circumferential orientations.

The inner tube 16 may be made from a material that has at least the same yield point as the material from which the pipe joint 10 is made.

An example structure for the pin end tool joint 14 is shown in end view in FIG. 2A and in side cut away view in FIG. 2B. In FIG. 2B, the interior of the end of the male threaded coupling may include a retaining feature such as a generally cylindrically shaped receiving bore 15 ("pin end receiving bore") having a larger diameter than the nominal internal diameter of the pin end 14. The receiving bore 15 may extend longitudinally for a selected length to terminate in an internal shoulder 17, wherein the pin end 14 may be maintained at its nominal internal diameter. The shoulder 17 provides a positive stop for the tube retainer (18 in FIG. 1) when the inner tube (16 in FIG. 1) is inserted into the pipe joint (10 in FIG. 1).

Figure 3B:
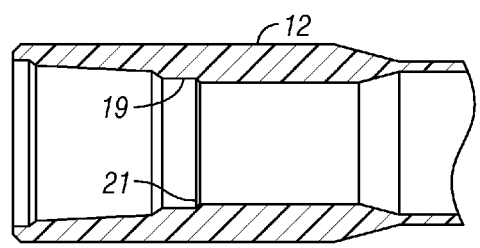

An example structure for the box end tool joint 12 is shown in end view in FIG. 3A and in cut away side view in FIG. 3B. In FIG. 3B, the longitudinally innermost portion of the threaded coupling may include a retaining feature such as a generally cylindrically shaped receiving bore 19 ("box end receiving bore") having a diameter larger than the nominal internal diameter of the tool joint 12 and that extends longitudinally into the tool joint for a selected length. The box end receiving bore 19, similar to the pin end receiving bore, terminates in a shoulder 21 where the nominal internal diameter of the tool joint 12 resumes. The shoulder 21 provides a positive stop for the retaining device (20 in FIG. 1).

Figure 4A:
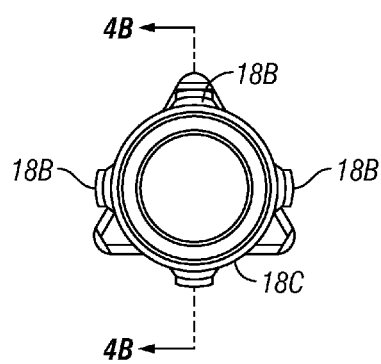
FIGS. 4A and 4B, show, respectively, an end view and a side section of a tube retainer/sealing device disposed in the modified pin end (FIGS. 2A and 2B) of the conventional drill pipe.
Figure 4B:
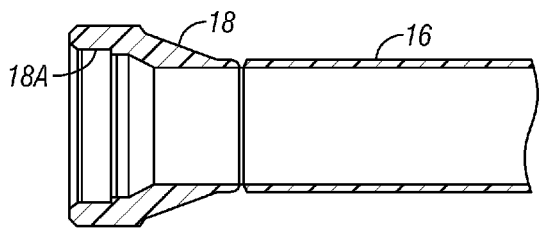

FIGS. 4A and 4B show, respectively, an end view and a cut away side view of the pin end tube retainer 18 (also referred to herein as the "pin end inner tube seal assembly" later in the present description). FIG. 4B shows that the pin end tube retainer 18 may include a generally cylindrically shaped main body 18C with a plurality of circumferentially spaced apart protrusions 18B. The protrusions 18B subtend a diameter that may be approximately the same as the pin end receiving bore (15 in FIG. 2B). The protrusions 18B provide the pin end tube retainer 18 with the capability of being longitudinally stopped by the shoulder (17 in FIG. 2B) while enabling fluid flow through the annular space (13 in FIG. 1). The pin end tube retainer 18 may be affixed to the inner tube 16 such as by welding. The pin end tube retainer 18 may include a generally cylindrical inner bore 18A having a diameter selected to engage a seal assembly (FIG. 6) disposed on the opposed end of an adjacent segment of the inner tube. The pin end tube retainer 18 inner bore 18A may have a taper in its internal diameter for engaging anti extrusion rings (FIG. 6) that hold a seal in the seal assembly, as will be further explained with reference to FIG. 5.

Figure 5:
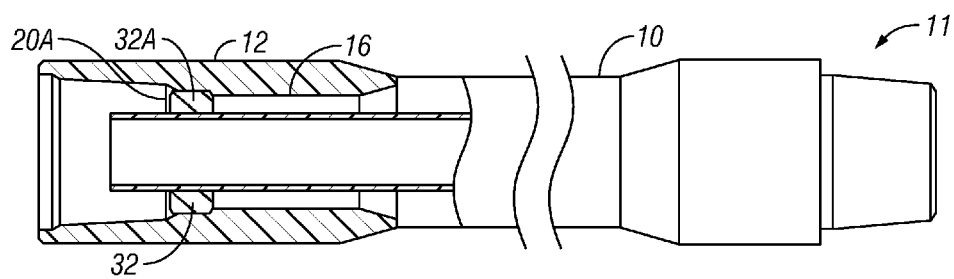
FIG. 5 shows an example of a female end of an inner pipe seal assembly.

FIG. 5 shows a sectional view of the dual drill pipe joint 11, in particular the box end inner tube retaining device 20. In the present example the box end inner tube retainer (referred to later herein as the "male seal assembly") 20 may be threadedly coupled to a corresponding thread formed at a selected distance from the longitudinal end of the inner tube 16. The box end inner tube retainer 20 may thus be threadedly affixed to the inner tube 16. A snap ring or spiral locking ring 32 may be used to hold the box end retainer 20 in place on the inner tube 16.

Assembling the joint of dual drill pipe 11 may include the following steps. The inner tube 16 may have the pin end tube retainer 18 affixed to one longitudinal end thereof, such as, for example, by welding. The assembled inner tube 16, and pin end tube retainer 18 may be inserted into the pipe joint (10 in FIG. 1) through the pin end tool joint (12 in FIG. 1) until the pin end retaining device 18 stops on the pin end shoulder (17 in FIG. 2B). The length of the inner tube 16 in the present example may selected so that when no longitudinal stress is applied to the inner tube 16 the threads for the box end retainer 20 would be at a longitudinal position inside the tool joint beyond the box end shoulder (21 in FIG. 3B). Longitudinal tension may be applied to the inner pipe 16 so that the threads for the box end retainer 20 become accessible. The box end retainer 20 may then be threaded onto the exterior of the inner tube 16, and the locking ring 32 affixed to the inner tube 16. The longitudinal end of the box end retainer 20 may include an internal bevel, groove or recess 32A on its internal diameter that covers the locking ring 32 by unthreading the box end retainer 20 from the inner tube 16 until unthreading is stopped by the locking ring 32. Such configuration may provide increased reliability by preventing the locking ring 32 from disengaging the inner tube 16. Tension may then be released from the inner tube 16 so that the box end retainer 20 rests on the box end shoulder (21 in FIG. 3B). Thus, the inner tube 16 may be retained in the pipe joint 10 so that the longitudinal ends of the inner pipe 16 are in substantially fixed relation with the longitudinal ends of the pipe joint 10. The height and configuration of one or more standoffs (30 in FIG. 1) cooperate with the tension retained in the inner tube 16 to provide stable bending of the inner tube 16 as the pipe joint 10 is bent during ordinary drilling operations and substantially prevents buckling of the inner tube 16. Tension may be retained in the inner tube 16 after the foregoing assembly procedure by suitable selected of the unstressed length of the inner tube 16.

Figure 6:
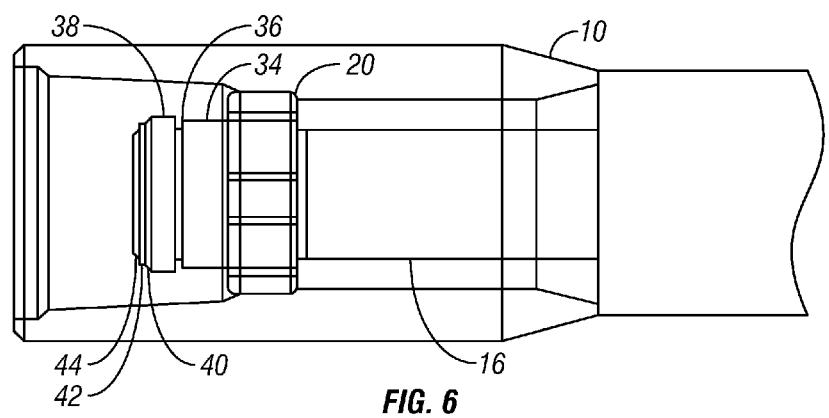
FIG. 6 shows a side view of a retaining ring disposed on the end of the inner tube engaged with the modified box end shown in FIGS. 3A and 3B.

After completion of the foregoing assembly procedure, and referring to FIG. 6, a first example of a seal assembly may be affixed to the end of the inner pipe 16 extending longitudinally outward (with reference to the box end) beyond the box end retainer 20. The seal assembly may include a connector spacer 34 placed in contact with the box end retainer 20 by sliding longitudinally along the inner tube 16. Next a first anti extrusion ring 36 may be applied to the end of the inner tube 16. A seal 38, which may be made from elastomer and be shaped substantially as an annular ring may be disposed on the inner tube 16 end. The seal 38 may be followed by a second anti extrusion ring 40. The second anti extrusion ring 40 may have a smaller diameter than the first anti extrusion ring 36 to cooperatively engage with the tapered inner surface (18A in FIG. 4B) of the pin end retainer (18 in FIG. 4B), as will be further described with reference to FIG. 8. The second anti extrusion ring 40 may be followed by a spacer shim 42 as needed and a spiral or other type of locking ring 44 to hole the entire seal assembly as described longitudinally on the end of the inner tube 16.

When a joint of dual drill pipe configured and assembled as explained above is threadedly coupled to an adjacent joint of the dual drill pipe, the seal assembly shown in FIG. 6 sealingly engages the interior surface of the pin end retainer 18 in the adjacent dual drill pipe joint. The box and pin end threads may be designed for metal to metal seal, or a separate sealing device may be used to cause the pipe joints 10 to sealingly engage each other when threaded together. As previously explained herein, the threads on the respective tool joints (12, 14 in FIG. 1) may be tapered. The shape, taper and respective internal diameters of the inner surface of the pin end retainer (see FIG. 4B) may enable assembly of one pipe joint to the next using conventional drill pipe assembly techniques, in which the threads on the mating tool joints provide for a selected amount of axial misalignment during initial threading of the pin end to the box end.

It will be appreciated by those skilled in the art that the example arrangement of a dual drill pipe, in which the inner tube is ordinarily in tension may be reconfigured so that the inner tube 16 is ordinarily in longitudinal compression. For example, the shoulder in either the pin end tool joint (14 in FIG. 1) or the box end tool joint (12 in FIG. 1) may be machined to stop the corresponding retainer from exiting the respective tool joint longitudinally, rather than stopping the corresponding retainer from entering the respective tool joint further. The opposed tool joint may have a suitable groove machined therein for a retaining ring such as a spiral locking ring or snap ring so that when the inner tube 16 is inserted into the pipe joint 10, after the respective retaining device stops on the corresponding shoulder, the inner pipe is compressed to enable insertion of the retaining ring. The uncompressed length of the inner pipe 16 may be selected so that when uncompressed, the snap ring groove is not accessible to retain the respective retaining device in the pipe joint 10.

Example inner tube seal assembly components will now be explained in more detail with reference to FIGS. 7-12.

Figure 7:
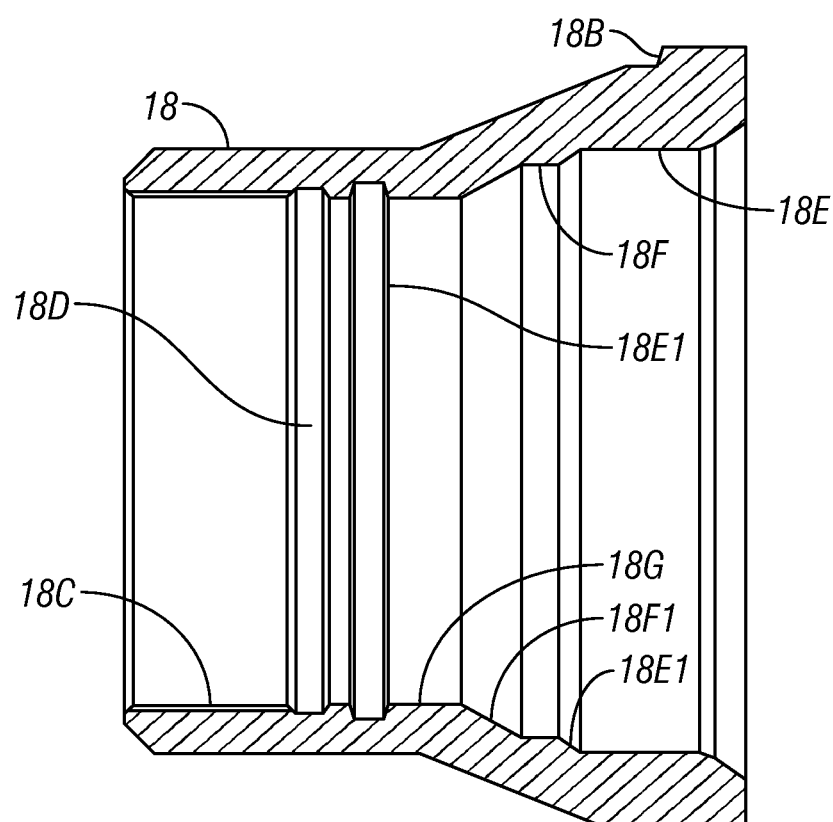
FIG. 7 shows an example female seal seat assembly disposed on the end of the inner tube.

FIG. 7 shows an example of a pin end inner tube retainer 18, which as stated above may also perform the function of the pin end inner tube seal assembly. The pin end inner tube retainer 18 (hereinafter referred to as the female inner tube seal assembly) may include a shoulder 18B that cooperatively engages the shoulder (15 in FIG. 2B) formed in the pin end tool joint connection (14 in FIG. 2B). An internal opening on one end of the female inner tube seal assembly 18, shown at 18C may have an internal diameter selected to receive one end of the inner tube (16 in FIG. 1). The female inner tube seal assembly 18 may be welded to the end of the inner tube (16 in FIG. 1) or may be affixed, for example, using a retaining ring 18E1 and internal seal 18D. An internal bore at the open end of the female inner tube seal assembly 18, for receiving the opposed end of an adjacent segment of the inner tube (16 in FIG. 1) may include a larger diameter segment 18E having an internal diameter selected to engage a seal ring (explained with reference to FIG. 8). The larger diameter segment 18E may be adjacent, through a suitable taper or beveled portion 18E1 to a smaller diameter portion 18F. The smaller diameter portion 18F may engage a corresponding portion of the box end of the inner tube seal assembly (explained with reference to FIG. 8). The smaller diameter portion 18F may be further tapered at its opposite longitudinal end, at 18F1, to a minimum internal diameter portion 18G, which may form a positive stop for longitudinal motion of the box end (FIG. 8) inner tube seal assembly into the pin end of the inner tube seal assembly 18.

Figure 8:
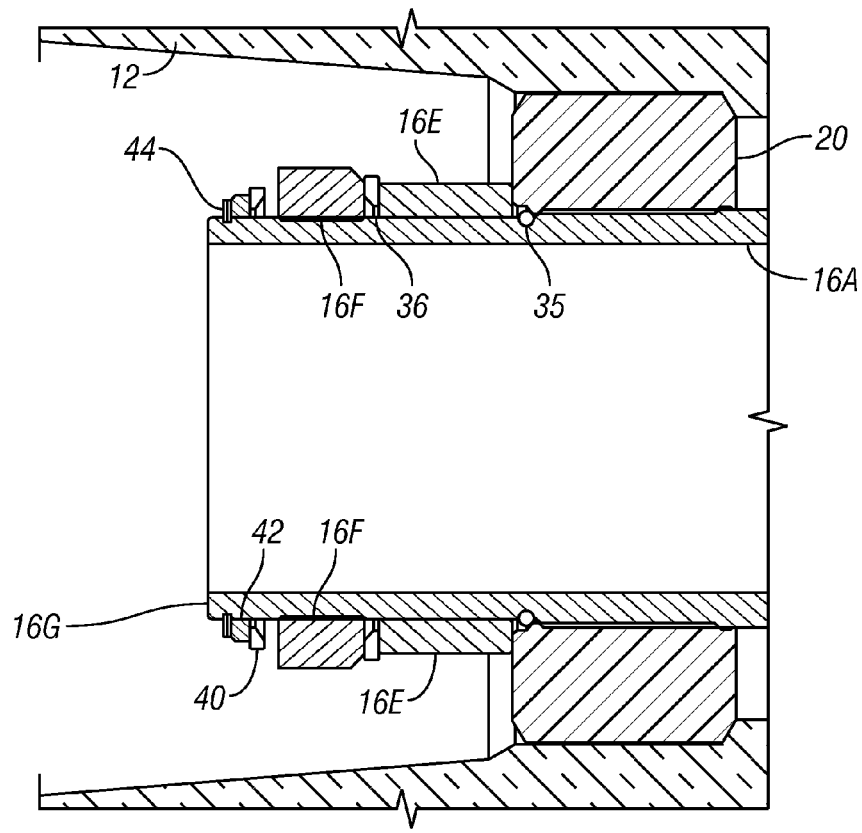
FIG. 8 shows an example of a male end of an inner tube seal assembly.

A box end of the inner tube seal assembly is shown at 16A in FIG. 8. The present example of the box end inner tube seal assembly 16A, referred to hereinafter as the "male seal assembly") may be formed directly into the longitudinal end of the inner tube extending beyond the inner tube retainer 20. The inner tube retainer 20 may be threadedly engaged with an outer surface of the inner tube 16. The opposite longitudinal end of the male inner tube seal assembly 16A may include a larger outer diameter portion 16E adjacent to a seal area or groove 16F in which may include an elastomer or similar seal ring 38. A smaller outer diameter portion of the opposite longitudinal end, shown at 16G, may be adjacent to the other end of the seal groove 16E. The seal groove 16F may include, as explained with reference to FIG. 6, a lock ring 44, spacer shim 42, front anti-extrusion ring 40, the seal 38, and a rear anti extrusion ring 36 as explained with reference to FIG. 6.

Figure 9:
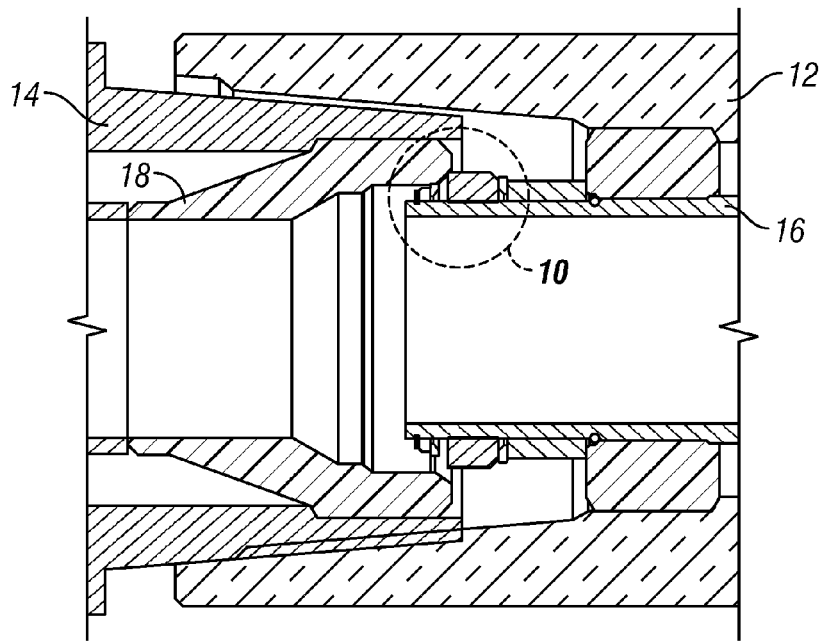
FIG. 9 shows the inner seal assembly male and female sections partially engaged.
Figure 10:
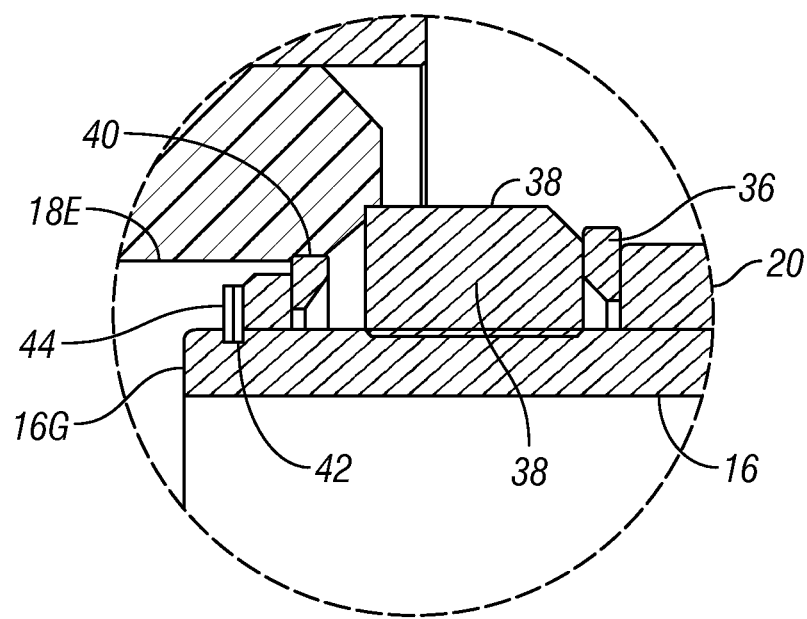
FIG. 10 shows a detailed view of the seal portion of the sections shown in FIG. 9.

Because the inner tube (16 in FIG. 1) is held in fixed longitudinal relationship with the drill pipe segment (11 in FIG. 1), as the pin end and box end thereof are threadedly engaged as explained above, the female inner tube seal assembly 16A will be drawn into engagement longitudinally with the male inner tube seal assembly (18 in FIG. 7). Referring to FIG. 9, the two components of the inner tube seal assembly are shown being drawn together. The drill pipe box end and pin end are omitted from FIG. 9 for clarity of the illustration. The relevant portions of the male and female inner tube seal assemblies 16A, 18 are shown in detail in FIG. 10. The smaller diameter portion 16G of the male inner tube seal assembly may be longitudinally disposed within the larger diameter portion 18E of the female seal assembly 18 during engagement. The relative diameters of the foregoing components may be selected to enable a selected amount of axial misalignment (e.g., lateral displacement of the axes of the adjacent drill pipe segments during threaded engagement) without causing contact between the respective tube seal assembly components at the maximum axial displacement possible using tapered threads on the respective tool joints (12, 14 in FIG. 1). FIGS. 9 and 10 show the seal assemblies when the two segments of drill pipe are at their maximum displacement transverse to the respective longitudinal axis of each drill pipe segment.

Figure 11:
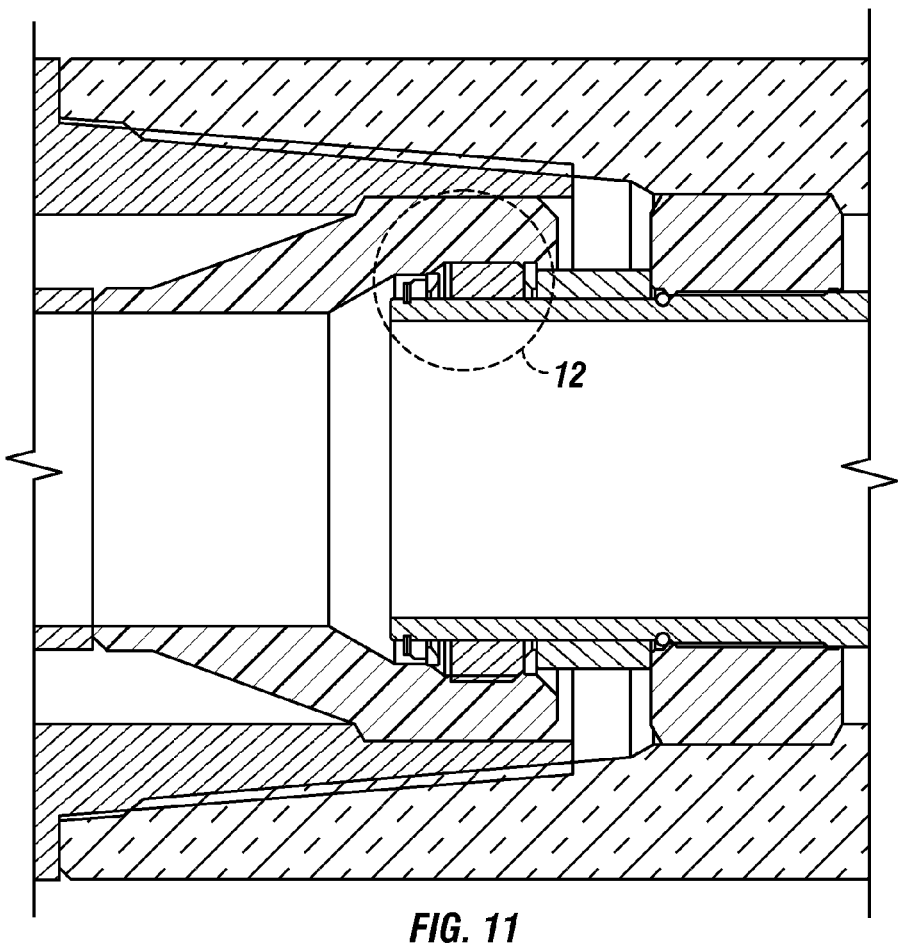
FIGS. 11 and 12 show similar views as FIGS. 9 and 10, with the seal portions more closely engaged.
Figure 12:
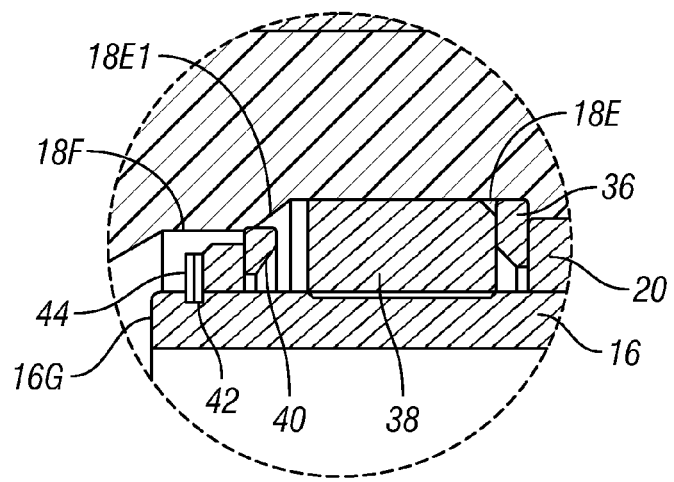

In FIG. 11, the male inner tube seal assembly 16A and the female 18 thereof are shown wherein the two drill pipe segments are fully threadedly engaged. Detail of the same components shown in FIG. 10 are shown in FIG. 12 as fully engaged longitudinally. The smaller diameter portion 16G of the male seal assembly can be observed in close proximity to the smaller diameter portion 18F of the female seal assembly. The respective smaller diameter portions 16G, 18F may have external and internal diameters selected, respectively, to enable free longitudinal movement of the smaller diameter portions 16G, 18F past each other, while causing the seal ring 38 to remain fully energized.

A nested dual drill pipe having an internal tube seal assembly according to the present example may have one or more of the following advantages. The dual drill pipe may be assembled substantially identically to conventional drill pipe. The inner tube does not require extended length or specially configured seal surfaces because the ends of the inner tube may be in longitudinally fixed relationship with respect to the longitudinal ends of the pipe joint. The inner tube may be less susceptible to buckling or damage because of the helical shaped imposed thereon by the standoff configuration and a seal element may be less susceptible to extrusion while providing for simple assembly and providing for axial misalignment of adjacent drill pipe segments during threaded assembly and disassembly.

Figure 13:
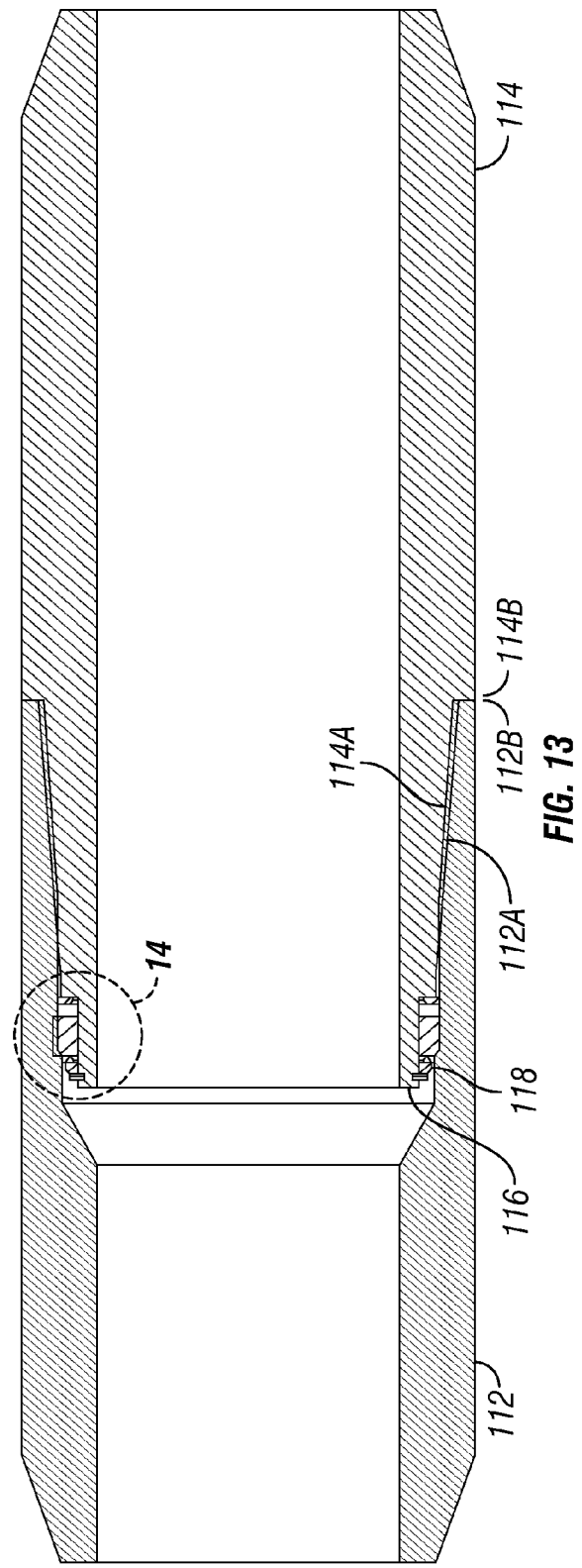
FIGS. 13 and 14 show views similar to FIGS. 11 and 12, respectively, wherein a seal assembly is used on a drill pipe.

In another example, the seal assembly used on an inner pipe of a nested dual drill pipe may be used on the outer pipe, or on a conventional single drill pipe. FIG. 13 shows the a pin end tool joint 114 of one segment of a drill pipe (similar to that shown in FIG. 1) coupled to a box end tool joint 112 of an adjacent segment of drill pipe. The tool joints 112, 114 may be coupled by respective tapered threads 112A, 114A. The threads 112A, 114A may be any type known in the art used for drill pipe. In the example shown in FIG. 13, the threads 112A, 114A may be stopped from further engagement by corresponding thread shoulders 112B, 114B. A seal assembly, including a male seal assembly 116 and a female seal assembly 118 may be disposed at the respective ends of the threads 114A, 112A. The female seal assembly 118 and male seal assembly 116 may have similar structure to that shown in and explained with reference to FIGS. 8 and 7, respectively.

Figure 14:
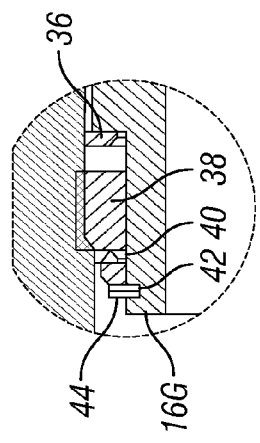

The seal assemblies are shown in FIG. 14 in detail. The male seal assembly may include the reduced diameter portion 16G, lock ring 44, spacer ring 42, first anti extrusion ring 40, seal ring 38 and second anti extrusion ring 36. The female seal assembly (118 in FIG. 13) may include similar diameter features as explained with reference to FIG. 7.

The drill pipe segment having seal assemblies as explained with reference to FIGS. 13 and 14 may also be used as the outer pipe in a nested dual drill pipe assembly, as explained with reference to FIGS. 1-12.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seal assembly for a nested dual drill pipe, comprising:
a tube having a female seal assembly at one longitudinal end thereof and male seal assembly at the other longitudinal end thereof, the tube nested in a segment of drill pipe having a tapered thread assembly guide at each longitudinal end;
wherein the female seal assembly includes a larger internal diameter portion at an open end thereof, a taper adjacent to the larger internal diameter portion and a smaller internal diameter portion adjacent to the taper;
wherein the male seal assembly includes a smaller external diameter portion at an open end thereof, a seal area adjacent to the smaller external diameter portion and a larger external diameter portion adjacent to the seal area; and
wherein the larger internal diameter portion and the smaller external diameter portion have diameters selected to prevent contact with each other during assembly of two adjacent drill pipe segments at a maximum axial misalignment allowed upon initial engagement of the tapered threads on the assembly guides on adjacent segments of drill pipe prior to the threads becoming fully engage, and wherein the larger and smaller internal diameter portions and the larger and smaller external diameter portions have diameters selected to enable free longitudinal movement of the male seal assembly into the female seal assembly while maintaining a seal ring in the seal area fully energized.

2. The seal assembly of claim 1 wherein the seal area further comprises an anti-extrusion ring on one side of the seal ring, the anti extrusion ring having a diameter selected to fit within the smaller internal diameter portion.

3. The seal assembly of claim 1 wherein the seal area further comprises an anti-extrusion ring on one side of the seal ring, the anti extrusion ring having a diameter selected to fit within the larger internal diameter portion.

4. The seal assembly of claim 1 wherein the taper comprises an internal diameter equal to the internal diameter of the smaller diameter portion at a longitudinal end adjacent thereto and an internal diameter equal to the internal diameter of the larger internal diameter portion at a longitudinal end adjacent thereto.

5. The seal assembly of claim 1 wherein the female seal assembly comprises a minimum internal diameter portion longitudinally inwardly from and proximate the smaller internal diameter portion, the minimum internal diameter portion having an internal diameter smaller than an outside diameter of the smaller outside diameter portion of the male seal assembly.

6. The seal assembly of claim 1 wherein the tapered assembly guide on each longitudinal end of the drill pipe comprises a corresponding tapered thread joint.

7. A seal assembly for a drill pipe, comprising:
a drill pipe segment having a female seal assembly at one longitudinal end thereof and male seal assembly at the other longitudinal end thereof, the segment of drill pipe having a tapered thread assembly guide at each longitudinal end;
wherein the female seal assembly includes a larger internal diameter portion at an open end thereof, a taper adjacent to the larger internal diameter portion and a smaller internal diameter portion adjacent to the taper;
wherein the male seal assembly includes a smaller external diameter portion at an open end thereof, a seal area adjacent to the smaller external diameter portion and a larger external diameter portion adjacent to the seal area; and
wherein the larger internal diameter portion and the smaller external diameter portion have diameters selected to prevent contact with each other during assembly of two adjacent drill pipe segments at a maximum axial misalignment allowed upon initial engagement of the tapered threads on the assembly guides on adjacent segments of drill pipe prior to the threads becoming fully engage, and wherein the larger and smaller internal diameter portions and the larger and smaller external diameter portions have diameters selected to enable free longitudinal movement of the male seal assembly into the female seal assembly while maintaining a seal ring in the seal area fully energized.

8. The seal assembly of claim 7 wherein the drill pipe segment forms an outer pipe of a nested dual drill pipe segment.

9. The seal assembly of claim 8 wherein an inner tube nested in the drill pipe segment comprises a female tube seal assembly at one longitudinal end thereof and male tube seal assembly at the other longitudinal end thereof;
wherein the female tube seal assembly includes a larger internal diameter portion at an open end thereof, a taper adjacent to the larger internal diameter portion and a smaller internal diameter portion adjacent to the taper;
wherein the male tube seal assembly includes a smaller external diameter portion at an open end thereof, a seal area adjacent to the smaller external diameter portion and a larger external diameter portion adjacent to the seal area; and wherein the larger internal diameter portion and the smaller external diameter portion of the respective tube seal assemblies have diameters selected to prevent contact with each other during assembly of two adjacent drill pipe segments at maximum axial displacement thereof, and wherein the larger and smaller internal diameter portions and the larger and smaller external diameter portions of the respective tube seal assemblies have diameters selected to enable free longitudinal movement of the male seal assembly into the female seal assembly while maintaining a seal ring in the seal area fully energized.

10. The seal assembly of claim 7 wherein the tapered guides comprise tapered threads.

11. The seal assembly of claim 7 wherein the seal area further comprises an anti-extrusion ring on one side of the seal ring, the anti extrusion ring having a diameter selected to fit within the smaller internal diameter portion.

12. The seal assembly of claim 7 wherein the seal area further comprises an anti-extrusion ring on one side of the seal ring, the anti extrusion ring having a diameter selected to fit within the larger internal diameter portion.

13. A seal assembly for a nested dual drill pipe, comprising:
a tube having a female seal assembly at one longitudinal end thereof and male seal assembly at the other longitudinal end thereof, the tube nestable in a segment of drill pipe having a tapered assembly guide at each longitudinal end;
wherein the female seal assembly includes a larger internal diameter portion at an open end thereof, a taper adjacent to the larger internal diameter portion and a smaller internal diameter portion adjacent to the taper;
wherein the male seal assembly includes a smaller external diameter portion at an open end thereof, a seal area adjacent to the smaller external diameter portion and a larger external diameter portion adjacent to the seal area;
wherein the larger internal diameter portion and the smaller external diameter portion have diameters selected to prevent contact with each other during assembly of two adjacent drill pipe segments at maximum axial displacement thereof, and wherein the larger and smaller internal diameter portions and the larger and smaller external diameter portions have diameters selected to enable free longitudinal movement of the male seal assembly into the female seal assembly while maintaining a seal ring in the seal area fully energized; and
wherein the seal area further comprises an anti-extrusion ring on at least one side of the seal ring, the anti extrusion ring having a diameter selected to fit within at least one of the smaller internal diameter portion and the larger internal diameter portion.

14. The seal assembly of claim 13 wherein the taper comprises an internal diameter equal to the internal diameter of the smaller diameter portion at a longitudinal end adjacent thereto and an internal diameter equal to the internal diameter of the larger internal diameter portion at a longitudinal end adjacent thereto.

15. The seal assembly of claim 13 wherein the female seal assembly comprises a minimum internal diameter portion longitudinally inwardly from and proximate the smaller internal diameter portion, the minimum internal diameter portion having an internal diameter smaller than an outside diameter of the smaller outside diameter portion of the male seal assembly.

16. The seal assembly of claim 13 wherein the tapered assembly guide on each longitudinal end of the drill pipe comprises a corresponding tapered thread joint.

* * * * *